United States Patent
Meerpohl

(10) Patent No.: US 7,350,364 B2
(45) Date of Patent: Apr. 1, 2008

(54) EVAPORATIVE COOLING SYSTEM FOR POULTRY HOUSES AND THE LIKE

(75) Inventor: Bernhard J. Meerpohl, Calveslage (DE)

(73) Assignee: Big Dutchman, Inc., Holland, MI (US)

( * ) Notice: Subject to any disclaimer, the term of this patent is extended or adjusted under 35 U.S.C. 154(b) by 247 days.

(21) Appl. No.: 11/334,897

(22) Filed: Jan. 17, 2006

(65) Prior Publication Data

US 2007/0163280 A1    Jul. 19, 2007

(51) Int. Cl.
F25D 17/06    (2006.01)
F28D 5/00     (2006.01)

(52) U.S. Cl. ............................................. 62/91; 62/310

(58) Field of Classification Search ............... 62/91, 62/171, 310, 314, 315, 304, 176.4; 261/97, 261/108, DIG. 41; 119/437
See application file for complete search history.

(56) References Cited

U.S. PATENT DOCUMENTS

| 2,636,371 | A |   | 4/1953  | Stephens |
|-----------|---|---|---------|----------|
| 3,965,691 | A | * | 6/1976  | Van Huis .................... 62/157 |
| 4,031,180 | A |   | 6/1977  | Bohanon |
| 4,389,352 | A |   | 6/1983  | Bohanon, Sr. |
| 4,499,031 | A |   | 2/1985  | Sexton et al. |
| 4,773,471 | A | * | 9/1988  | Grant et al. .................. 165/60 |
| 5,130,063 | A |   | 7/1992  | Collins et al. |
| 5,492,082 | A | * | 2/1996  | Krevinghaus et al. ...... 119/448 |
| 5,692,386 | A | * | 12/1997 | Casey, Sr. .................. 62/176.4 |
| 5,966,953 | A |   | 10/1999 | Murr et al. |
| 5,971,370 | A |   | 10/1999 | Galabinski |
| 6,073,586 | A |   | 6/2000  | Medlin et al. |
| 6,079,365 | A |   | 6/2000  | Medlin et al. |
| 6,533,253 | B1| * | 3/2003  | Calvert ......................... 261/30 |
| 6,796,136 | B1| * | 9/2004  | Sullivan et al. ............... 62/171 |
| 2003/0001294 | A1 |   | 1/2003 | Permenter |
| 2004/0144110 | A1 |   | 7/2004 | Reeves et al. |

FOREIGN PATENT DOCUMENTS

JP          9-135648 A    *    5/1997

* cited by examiner

*Primary Examiner*—Mohammad M. Ali
(74) *Attorney, Agent, or Firm*—Price, Heneveld, Cooper, DeWitt & Litton, LLP

(57) ABSTRACT

An evaporative cooling system for poultry houses and the like includes a cooling water reservoir, at least one evaporative pad positioned directly above the reservoir, and fan disposed on one side of the pad to draw ambient air horizontally through the pad to evaporate a portion of the cooling water flowing vertically therethrough, and flow the cooled air into the interior of the poultry house. A header is disposed above and along the upper end of the pad, and includes a conduit flowing cooling water longitudinally therethrough with orifices shaped to emit streams of cooling water in an outwardly direction. A deflector extends above and outwardly of the conduit, and has a hood-shaped configuration which deflects the streams of cooling water from the orifices and disburses the same in a predetermined pattern onto and across the upper end of the pad. The deflector has a flexible portion which permits the configuration of the deflector and the spray pattern to be varied to accommodate different configurations of the pad.

30 Claims, 11 Drawing Sheets

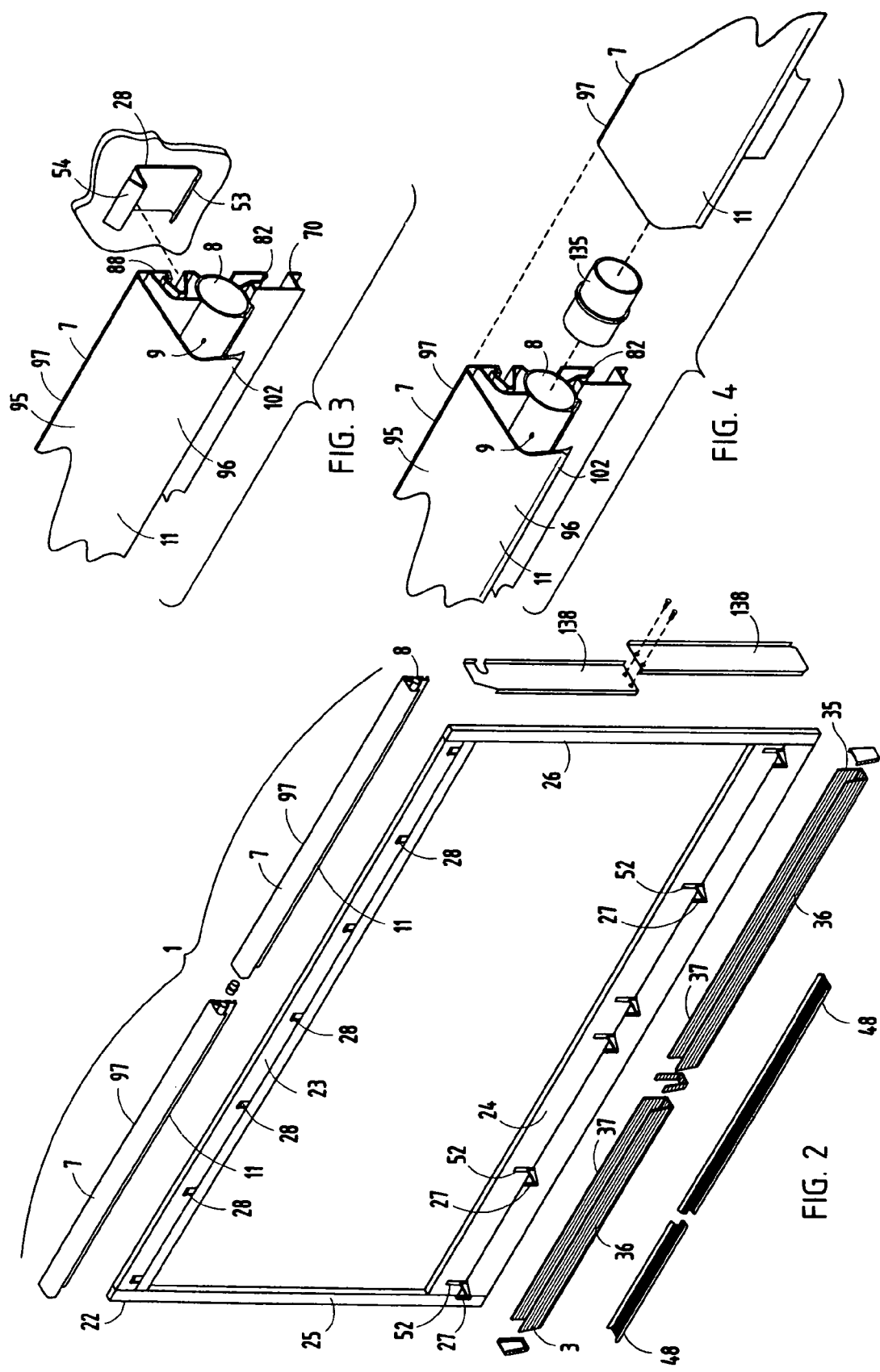

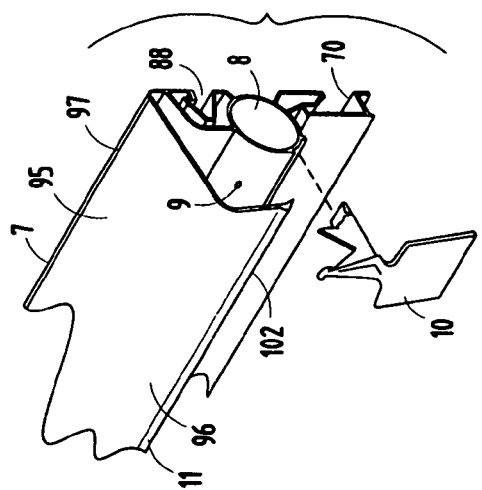
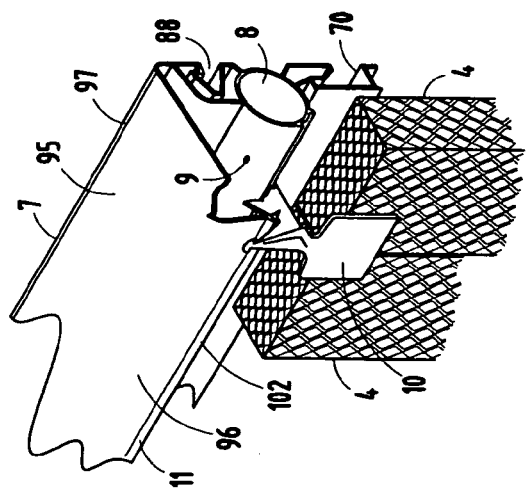
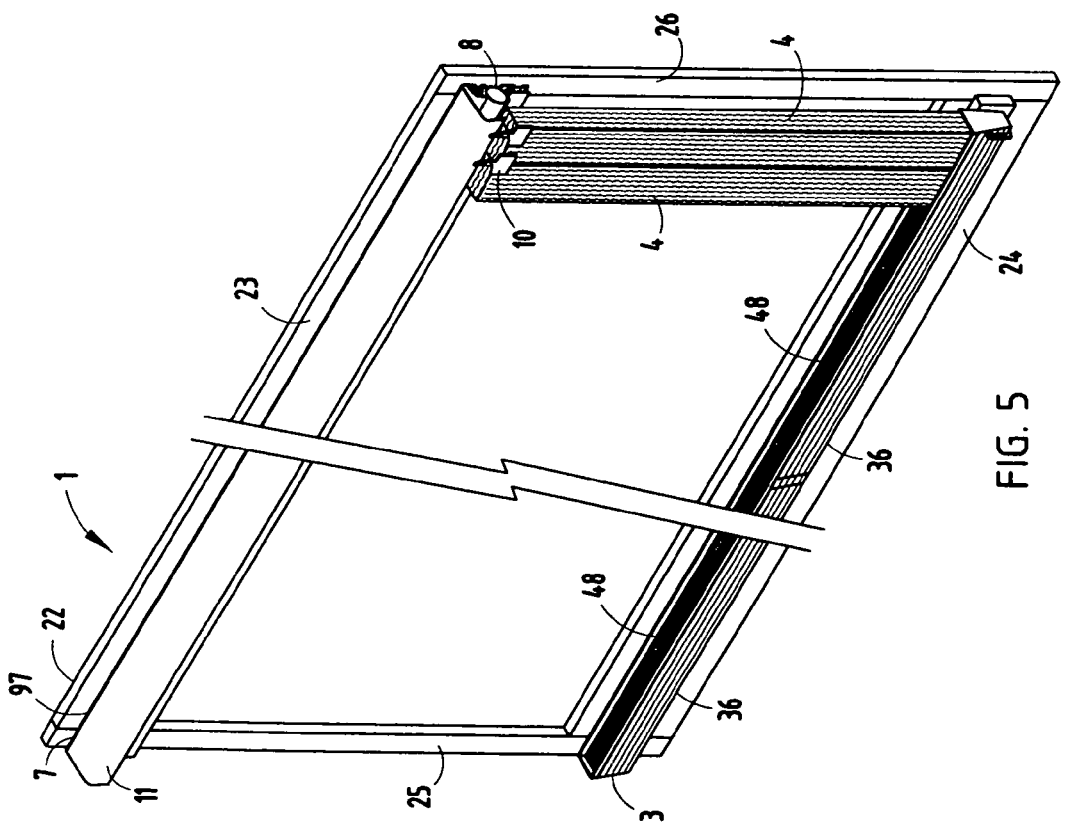

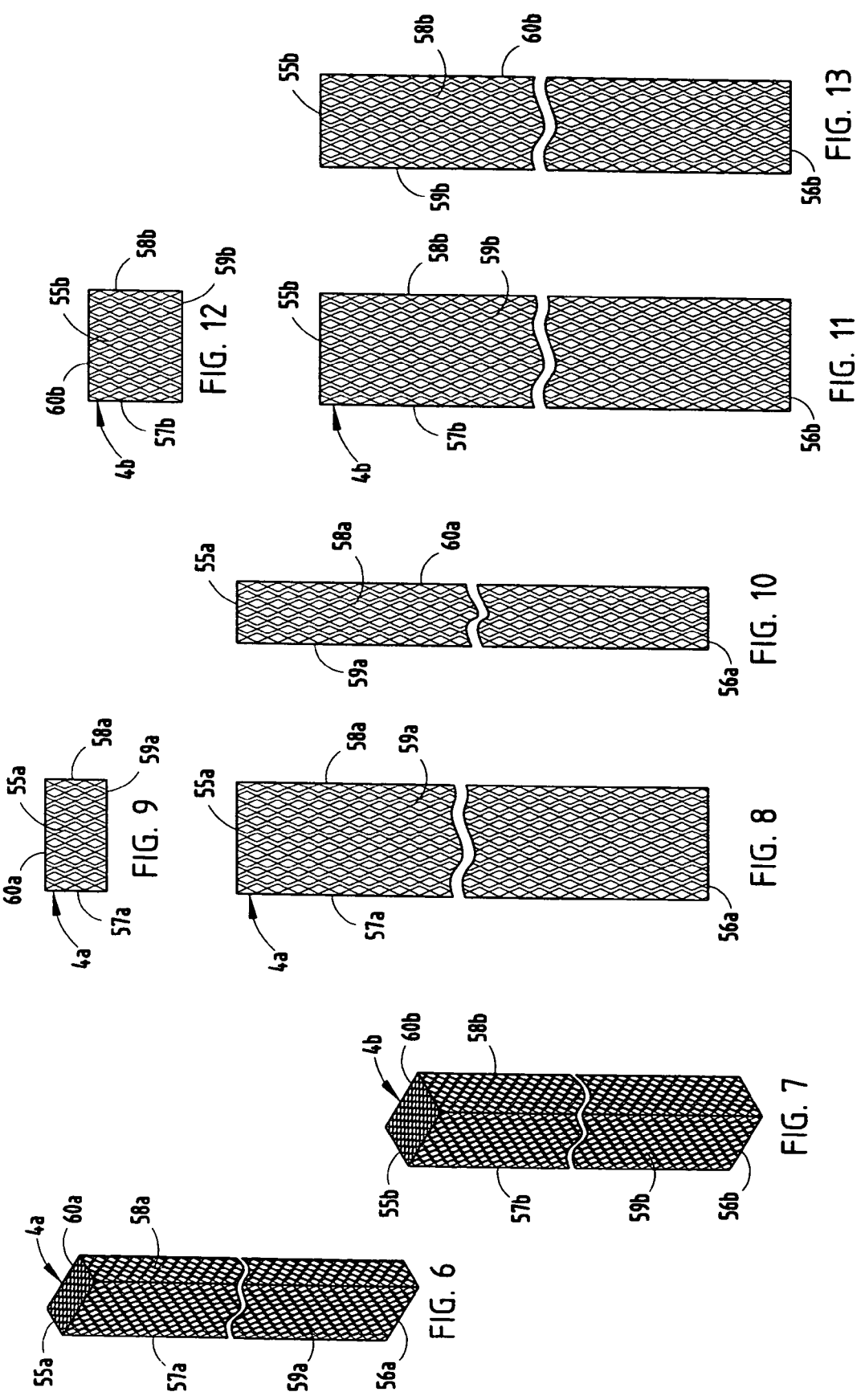

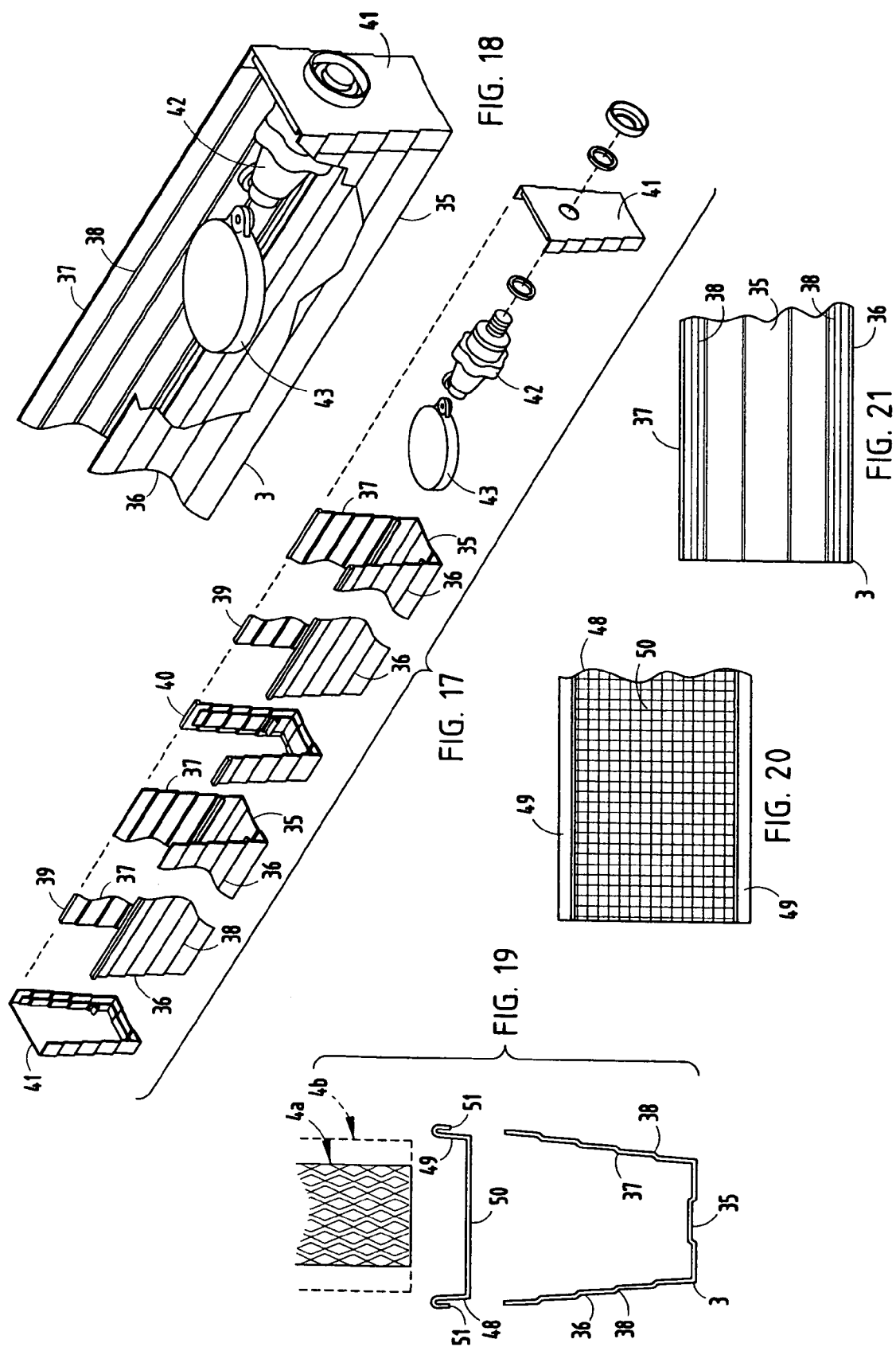

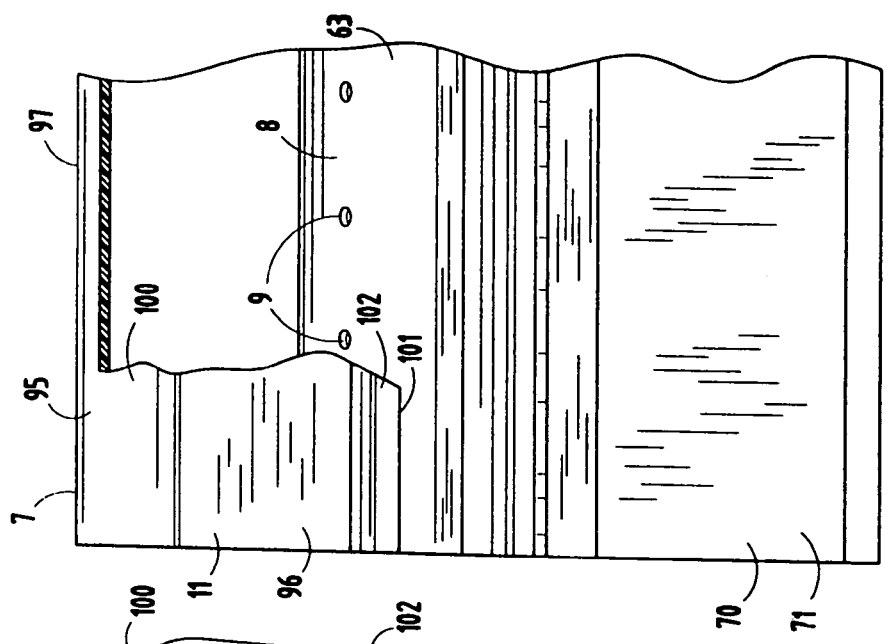
FIG. 25
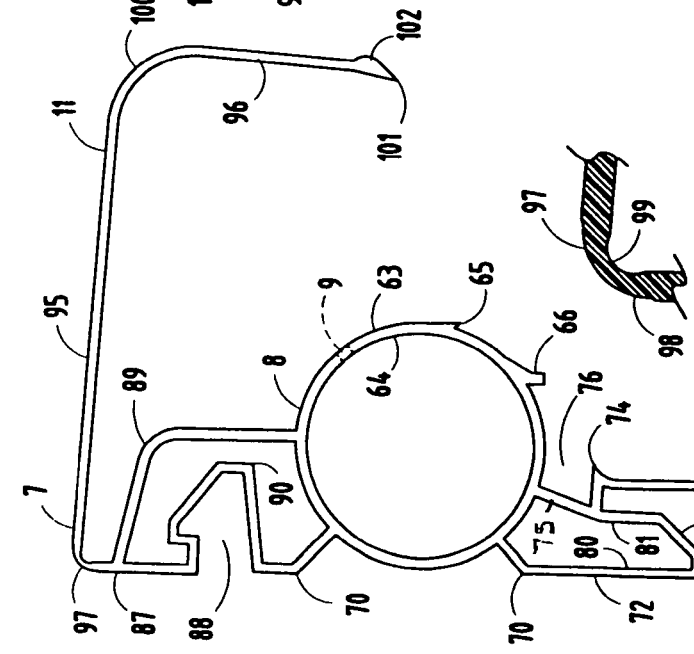
FIG. 24
FIG. 24A
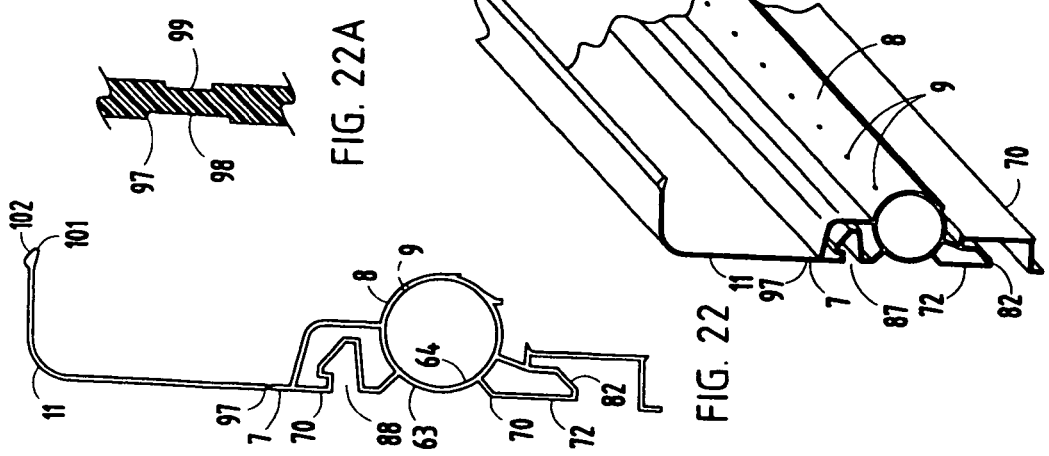
FIG. 22A
FIG. 22
FIG. 23

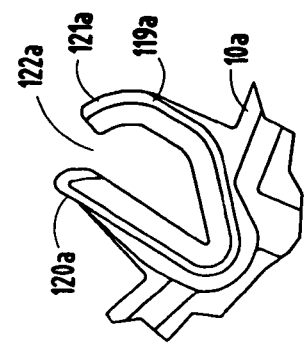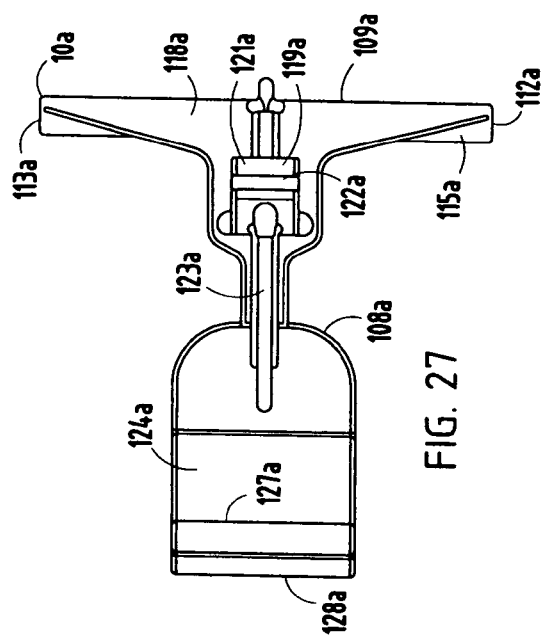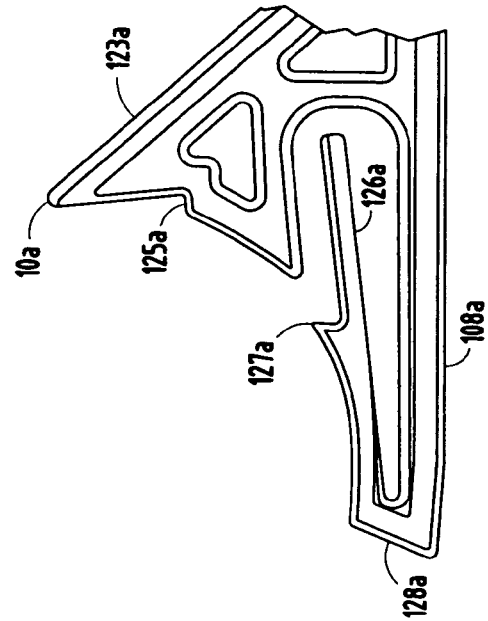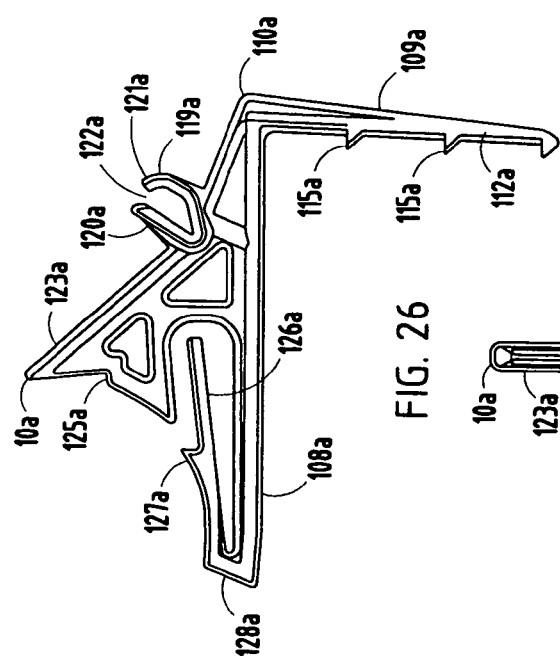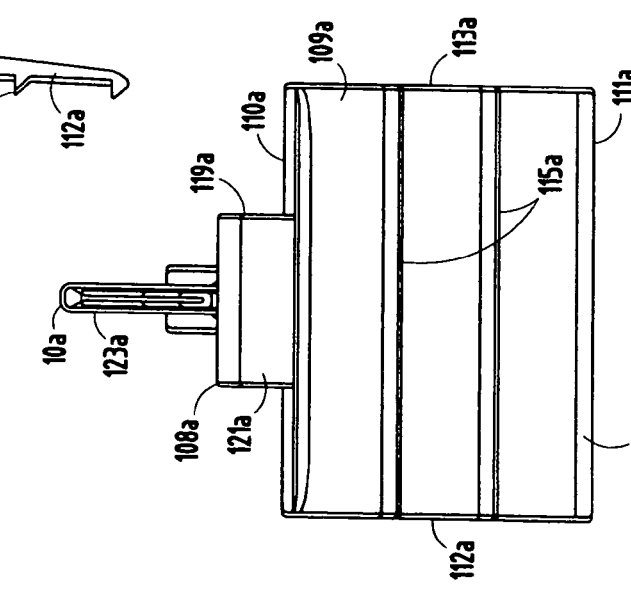

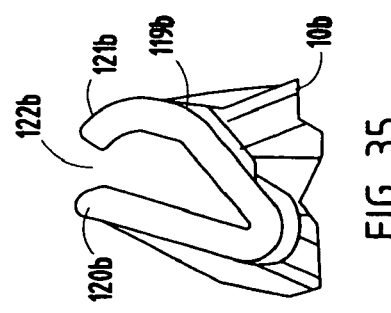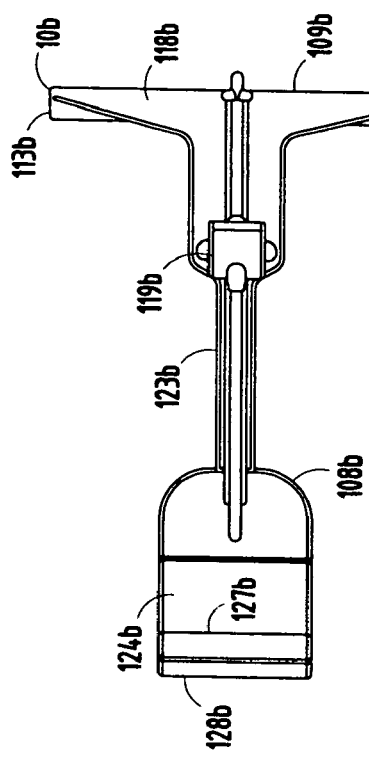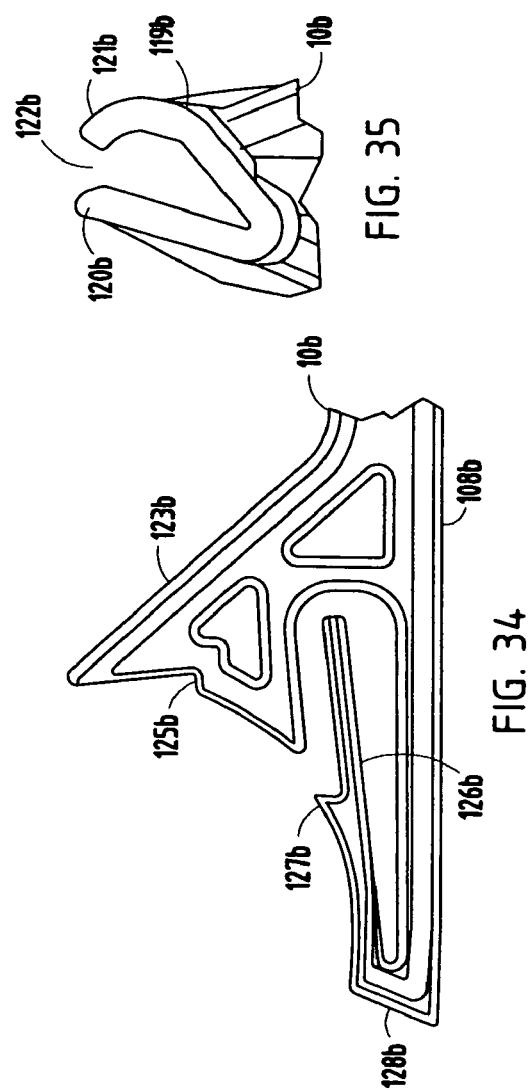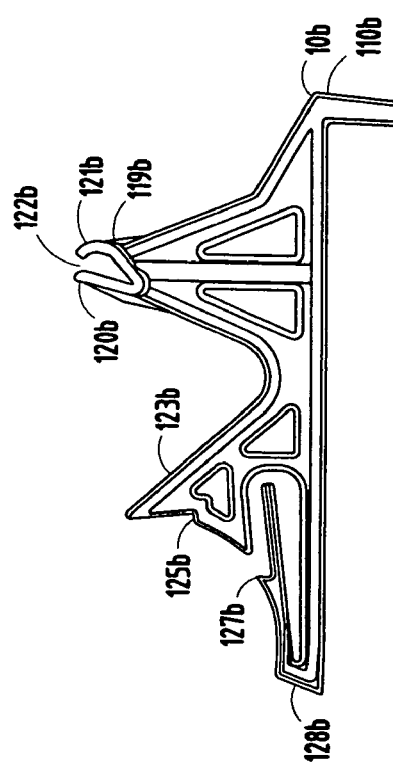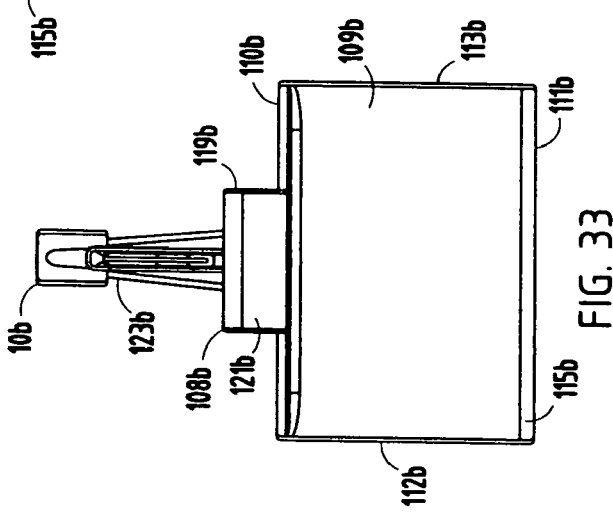

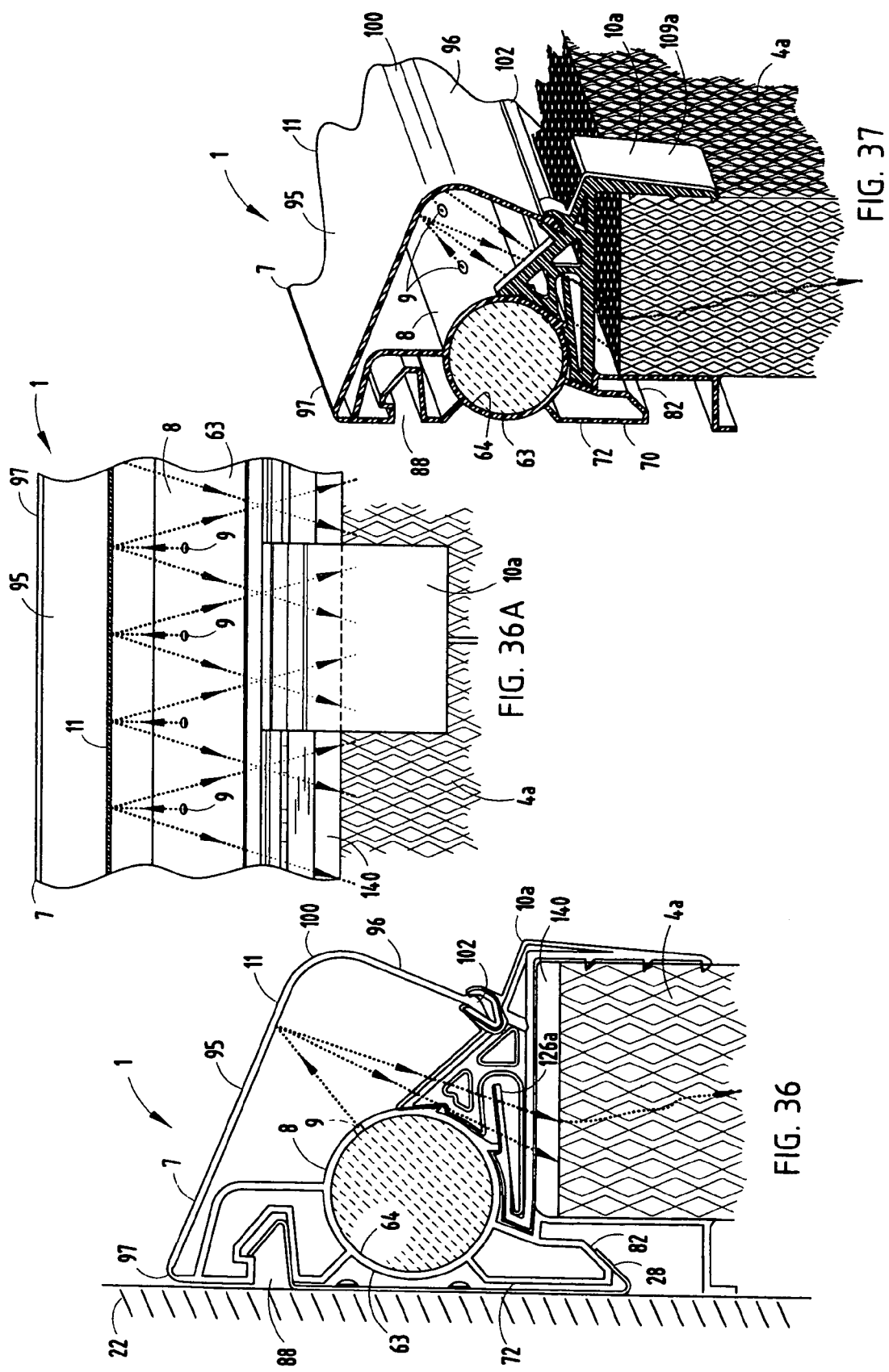

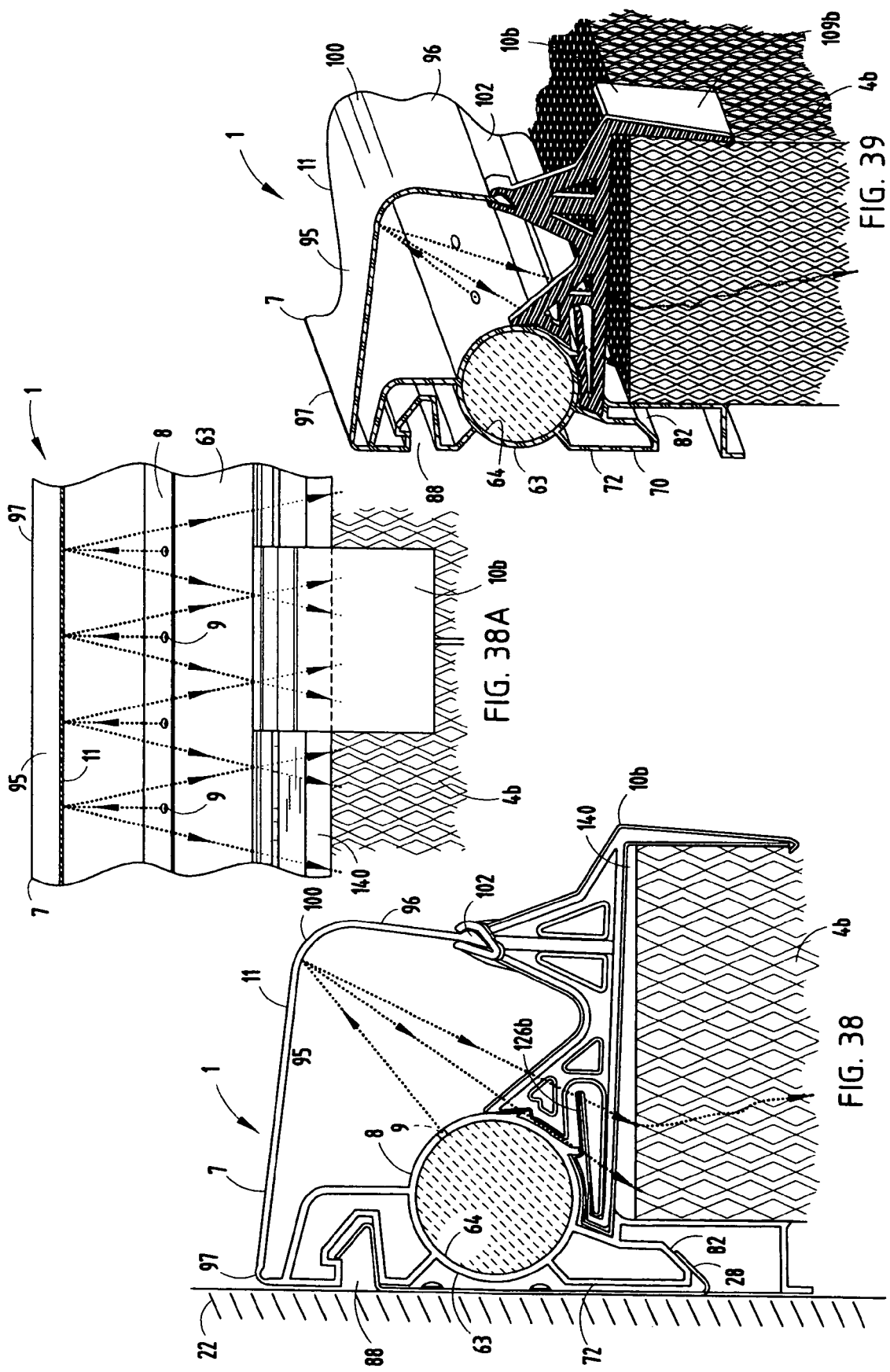

EVAPORATIVE COOLING SYSTEM FOR POULTRY HOUSES AND THE LIKE

BACKGROUND OF THE INVENTION

The present invention relates to evaporative cooling systems for poultry houses and the like, and in particular to an improved reservoir, header and pad retainer arrangement therefor.

Evaporative cooling systems for agricultural and horticultural applications, such as poultry houses, and other similar buildings, are well known in the art, and serve to maintain the desired temperature, humidity and other similar environmental variables within the interior of the building to facilitate efficient production.

Evaporative coolers, such as those disclosed in U.S. Pat. Nos. 5,971,370 and 6,079,365, flow cooling water vertically through a plurality of evaporative cooling pads, and flow ambient air horizontally through the wetted pads to evaporate a portion of the cooling water in the pads, thereby lowering the temperature of the ambient air, and subsequently flow the cooled ambient air into the interior of the building to achieve the desired temperature and humidity. While such evaporative coolers have been generally successful, certain drawbacks have been experienced.

One problem encountered with some prior art evaporative coolers is when cooling water is drawn completely through the pads into the interior of building, thereby causing damage to adjacent equipment and/or the building structure. While adequate cooling water flow through the pads is important to maximize cooling efficiency, it is equally important to prevent water droplets from being emitted from the downstream faces of the pads.

Another drawback associated with at least some prior art evaporative coolers is that they are relatively expensive to manufacture and install, and are not readily adaptable for a wide variety of different applications. While evaporative cooling pads are provided in different sizes and thicknesses to accommodate various applications, the associated reservoir header and pad retainer mechanisms are typically unique to a specific pad configuration. Hence, most prior art evaporative coolers cannot be readily adapted to accept pads of different sizes and/or thicknesses depending upon the specific needs of a particular customer and/or application.

SUMMARY OF THE INVENTION

One aspect of the present invention is an evaporative cooling system for poultry houses and the like, comprising a reservoir disposed adjacent to an open portion of an associated poultry house, and configured to communicate with a source of cooling water, and flow cooling water through at least a portion of the system. The cooling system includes at least one evaporative pad configured to flow cooling water generally vertically therethrough and ambient air generally horizontally therethrough. The pad has a lower end positioned directly above the reservoir to drain cooling water from the lower end of the pad into the reservoir, and an upper end configured to receive cooling water thereon. A fan is positioned on one side of the pad, and is adapted to flow ambient air through the pad in a generally horizontal direction to evaporate a portion of the cooling water flowing generally vertically through the pad, and thereby lower the temperature of the ambient air, and subsequently flow the cooled ambient air into an interior portion of the poultry house. A header is disposed above and along the upper end of the pad, and includes a water distribution conduit configured to flow cooling water longitudinally therethrough, with a plurality of orifices positioned along the length of the conduit and shaped to emit streams of cooling water therefrom in a generally outwardly direction, and a deflector extending generally above and outwardly of the conduit, and having a generally hood-shaped, predetermined configuration which deflects the streams of cooling water emitted from the orifices, and disburses the same in a predetermined pattern onto and across the upper end of the pad. The deflector has a flexible portion which permits the predetermined configuration of the deflector and the predetermined spray pattern to be varied to accommodate different configurations of the pad.

Yet another aspect of the present invention is an evaporative cooling system for poultry houses and the like, comprising a reservoir disposed adjacent to an open portion of an associated poultry house, and configured to communicate with a source of cooling water, and flow cooling water through at least a portion of the system. The cooling system includes at least one evaporative pad configured to flow cooling water generally vertically therethrough and ambient air generally horizontally therethrough. The pad has a lower end positioned directly above the reservoir to drain cooling water from the lower end of the pad into the reservoir, and an upper end configured to receive cooling water thereon. A fan is positioned on one side of the pad, and is adapted to flow ambient air through the pad in a generally horizontal direction to evaporate a portion of the cooling water flowing generally vertically through the pad, and thereby lower the temperature of the ambient air, and subsequently flow the cooled ambient air into an interior portion of the poultry house. A header is disposed above and along the upper end of the pad, and includes a water distribution conduit configured to flow cooling water longitudinally therethrough, with a plurality of orifices positioned along the length of the conduit and shaped to emit streams of cooling water therefrom in a generally outwardly direction, a deflector extending generally above and outwardly of the conduit, and having a generally hood-shaped, predetermined configuration which deflects the streams of cooling water emitted from the orifices, and disburses the same in a predetermined pattern onto and across the upper end of the pad, and a base disposed generally below the conduit and having a first connector. A pad retainer has a first portion operably connected with an upper portion of the pad, and a second portion with a second connector configured to mate with the first connector on the base to securely, yet detachably, mount the pad retainer on the base of the header and thereby retain the pad in a generally vertical orientation.

Yet another aspect of the present invention is a method for making an evaporative cooling system for poultry houses and the like, comprising the steps of forming a reservoir with a configuration adapted to communicate with a source of cooling water, and flow cooling water through at least a portion of the system. The method further includes providing a plurality of first evaporative pads having upper and lower ends, a first predetermined thickness measured between opposite side faces, and a configuration which permits cooling water to flow generally vertically therethrough and ambient air to flow generally horizontally therethrough, as well as providing a plurality of second evaporative pads having upper and lower ends, a second predetermined thickness measured between opposite side faces which is different than the predetermined thickness of the first pads, and a configuration which permits cooling water to flow generally vertically therethrough and ambient air to flow generally horizontally therethrough. The method further includes forming a header with a water distribution conduit configured to flow cooling water longitudinally therethrough, and including a plurality of orifices positioned along the length of the conduit and shaped to emit streams of cooling water therefrom in a generally outwardly direction, and a deflector extending generally above and outwardly of the conduit, and having a generally hood-shaped, predetermined configuration which deflects the streams of cooling water emitted from the orifices, and is adapted to disburse the same in a predetermined pattern onto and across the upper end of at least one of the first and second pads. The method further includes forming a flexible living hinge along the deflector at a location which permits the predetermined configuration of the deflector and the predetermined spray pattern to be varied to accommodate use of either one of the first and second pads with the header. The method further includes forming a plurality of first pad retainers with first portions thereof configured to engage upper portions of the first pads, and lower portions configured for operable connection with the header to retain the first pads in a generally vertical orientation, as well as forming a plurality of second pad retainers with first portions thereof configured to engage upper portions of the second pads, and lower portions configured for operable connection with the header to retain the second pads in a generally vertical orientation. The method further includes mounting the reservoir adjacent to an open portion of an associated poultry house, communicating the reservoir with a source of cooling water, and selecting at least one of the first and second pads in accordance with the predetermined cooling requirements of the poultry house. The method further includes positioning the selected pad generally above the reservoir, such that the lower end of the selected pad is positioned directly above the reservoir to drain cooling water exiting from the lower end of the selected pad into the reservoir, and mounting the header along the upper end of the selected pad. The method further includes selecting at least one of the first and second pad retainers according to the predetermined thickness of the selected pad, and operatively connecting the upper portion of the selected pad retainer with the upper portion of the selected pad, and operatively connecting the lower portion of the selected pad retainer with the header to retain the selected pad in a generally vertical orientation above the reservoir. The method further includes flexing the deflector along the living hinge into a predetermined configuration which deflects the streams of cooling water emitted from the orifices, and disburses the same in a predetermined pattern onto and across the upper end of the selected pad, and operably connecting the deflector with the selected pad retainer to retain the deflector in the predetermined configuration.

Yet another aspect of the present invention is a method for making an evaporative cooling system for poultry houses and the like, comprising the steps of forming a reservoir with a configuration adapted to communicate with a source of cooling water, and flow cooling water through at least a portion of the system. The method further includes providing a plurality of first evaporative pads having upper and lower ends, a first predetermined thickness measured between opposite side faces, and a configuration which permits cooling water to flow generally vertically therethrough and ambient air to flow generally horizontally therethrough, as well as providing a plurality of second evaporative pads having upper and lower ends, a second predetermined thickness measured between opposite side faces which is different than the predetermined thickness of the first pads, and a configuration which permits cooling water to flow generally vertically therethrough and ambient air to flow generally horizontally therethrough. The method further includes forming a header with a water distribution conduit configured to flow cooling water longitudinally therethrough, and including a plurality of orifices positioned along the length of conduit and shaped to emit streams of cooling water therefrom in a generally outwardly direction, and a deflector extending generally above and outwardly of the conduit, and having a generally hood-shaped, predetermined configuration which deflects the streams of cooling water emitted from the orifices, and is adapted to disburse the same in predetermined pattern onto and across the upper end of at least one of the first and second pads, and a base disposed generally below the conduit and having a first connector. The method further includes forming a plurality of first pad retainers with upper portions configured to engage upper portions of the first pads, and lower portions with second connectors configured to mate with the first connector on the base of the header, as well as forming a plurality of second pad retainers with upper portions configured to engage upper portions of the second pads, and lower portions with second connectors configured to mate with the first connector on the base of the header. The method further includes mounting the reservoir adjacent to an open portion of an associated poultry house, communicating the reservoir with a source of cooling water, and selecting at least one of the first and second pads in accordance with the predetermined cooling requirements of the poultry house. The method further includes positioning the selected pad generally above the reservoir, such that the lower end of the selected pad is positioned directly above the reservoir to drain cooling water exiting from the lower end of the selected pad into the reservoir. The method further includes mounting the header along the upper end of the selected pad, selecting at least one of the first and second pad retainers according to the predetermined thickness of the selected pad, and operatively connecting the upper portion of the selected pad retainer with the upper portion of the selected pad, and detachably connecting the second connector on the lower portion of the selected pad retainer with the first connector on the base of the header to securely, yet detachably, mount the same thereon, and thereby retain the selected pad in a generally vertical orientation above the reservoir.

Yet another aspect of the present invention is an evaporative cooling unit which is readily adapted to accept a wide variety of different pad thicknesses and sizes to adapt the same to different applications and/or customers. The header has a deflector with a flexible portion which permits the predetermined configuration of the deflector and the predetermined spray pattern to be varied to accommodate different configurations of the pad. Pad retainers include connectors which mate with connectors on a base portion of the header to securely, yet detachably, mount the pad retainers on the base of the header and thereby retain the selected pads in a generally vertical orientation. The evaporative cooler has an uncomplicated design, with reduced manufacturing and installation costs, is efficient in use, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 2 is an exploded perspective view of frame, reservoir and header portions of the evaporative cooling system.

FIG. 3 is a perspective view of the header, showing attachment to the frame.

FIG. 4 is a perspective view of the header, showing interconnected adjacent header segments in an end-to-end relationship.

FIG. 5 is a fragmentary perspective view of the evaporative cooling system, showing evaporative pads mounted between the reservoir and the header.

FIG. 6 is a fragmentary perspective view of a first evaporative pad.

FIG. 7 is a fragmentary perspective view of a second evaporative pad having a thickness greater than the first evaporative pad.

FIG. 8 is a fragmentary front elevational view of the first evaporative pad.

FIG. 9 is a top plan view of the first evaporative pad.

FIG. 10 is a fragmentary side elevational view of the first evaporative pad.

FIG. 11 is a fragmentary front elevational view of the second evaporative pad.

FIG. 12 is a top plan view of the second evaporative pad.

FIG. 13 is a fragmentary side elevational view of the second evaporative pad.

FIG. 14 is a perspective view of the header and an associated pad retainer, shown prior to attachment to the header.

FIG. 15 is a perspective view of the header, shown with the pad retainer attached to the header and supporting evaporative pads.

FIG. 17 is a fragmentary exploded perspective view of the reservoir with an associated cooling water control mechanism.

FIG. 18 is a fragmentary perspective view of the reservoir, showing the cooling water control mechanism mounted in one end thereof.

FIG. 19 is an exploded side elevational view of the reservoir, support plate and lower portion of an associated evaporative pad.

FIG. 20 is a fragmentary top plan view of the support plate.

FIG. 21 is a fragmentary top plan view of the reservoir.

FIG. 22 is an end elevational view of the header, shown in an as molded condition, prior to assembly.

FIG. 22A is a fragmentary, enlarged cross-sectional view of a living hinge portion of the header, shown in the as molded condition, prior to assembly.

FIG. 23 is a fragmentary perspective view of the header, shown in the as molded condition, prior to assembly.

FIG. 24 is an end elevational view of the header, shown in a flexed or folded condition ready for assembly.

FIG. 24A is a fragmentary, enlarged cross-sectional view of the living hinge, shown in the folded condition ready for assembly.

FIG. 25 is a fragmentary front elevational view of the header shown in FIG. 24.

FIG. 26 is a side elevational view of the first pad retainer.

FIG. 27 is a top plan view of the first pad retainer.

FIG. 28 is a rear elevational view of the first pad retainer.

FIG. 29 is a fragmentary, enlarged side elevational view of a snap lock portion of the first pad retainer.

FIG. 30 is a fragmentary, enlarged side elevational view of a snap fastener portion of the first pad retainer.

FIG. 31 is a side elevational view of a second pad retainer.

FIG. 32 is a top plan view of the second pad retainer.

FIG. 33 is a rear elevational view of the second pad retainer.

FIG. 34 is a fragmentary, enlarged side elevational view of a snap lock portion of the second pad retainer.

FIG. 35 is a fragmentary, enlarged side elevational view of a snap fastener portion of the second pad retainer.

FIG. 36 is a side elevational view of the first pads and first pad retainers mounted on the header, showing water streams from the orifices being deflected onto the upper ends of the first pads.

FIG. 36A is a fragmentary front elevational view of the first pads and first pad retainers mounted on the header, showing water streams from the orifices being deflected onto the upper ends of the first pads.

FIG. 37 is a fragmentary perspective view of the first pads and first pad retainers mounted to the header, showing water streams from the orifices being deflected onto the upper ends of the first pads.

FIG. 38 is a side elevational view of the second pads and second pad retainers attached to the header, showing water streams from the orifices being deflected onto the upper ends of the second pads.

FIG. 38A is a fragmentary front elevational view of the second pads and second pad retainers mounted on the header, showing water streams from the orifices being deflected onto the upper ends of the second pads.

FIG. 39 is a fragmentary perspective view of the second pads and second pad retainers attached to the header, showing water streams from the orifices being deflected onto the upper ends of the second pads.

DETAILED DESCRIPTION OF THE PREFERRED EMBODIMENTS

Figure 1:
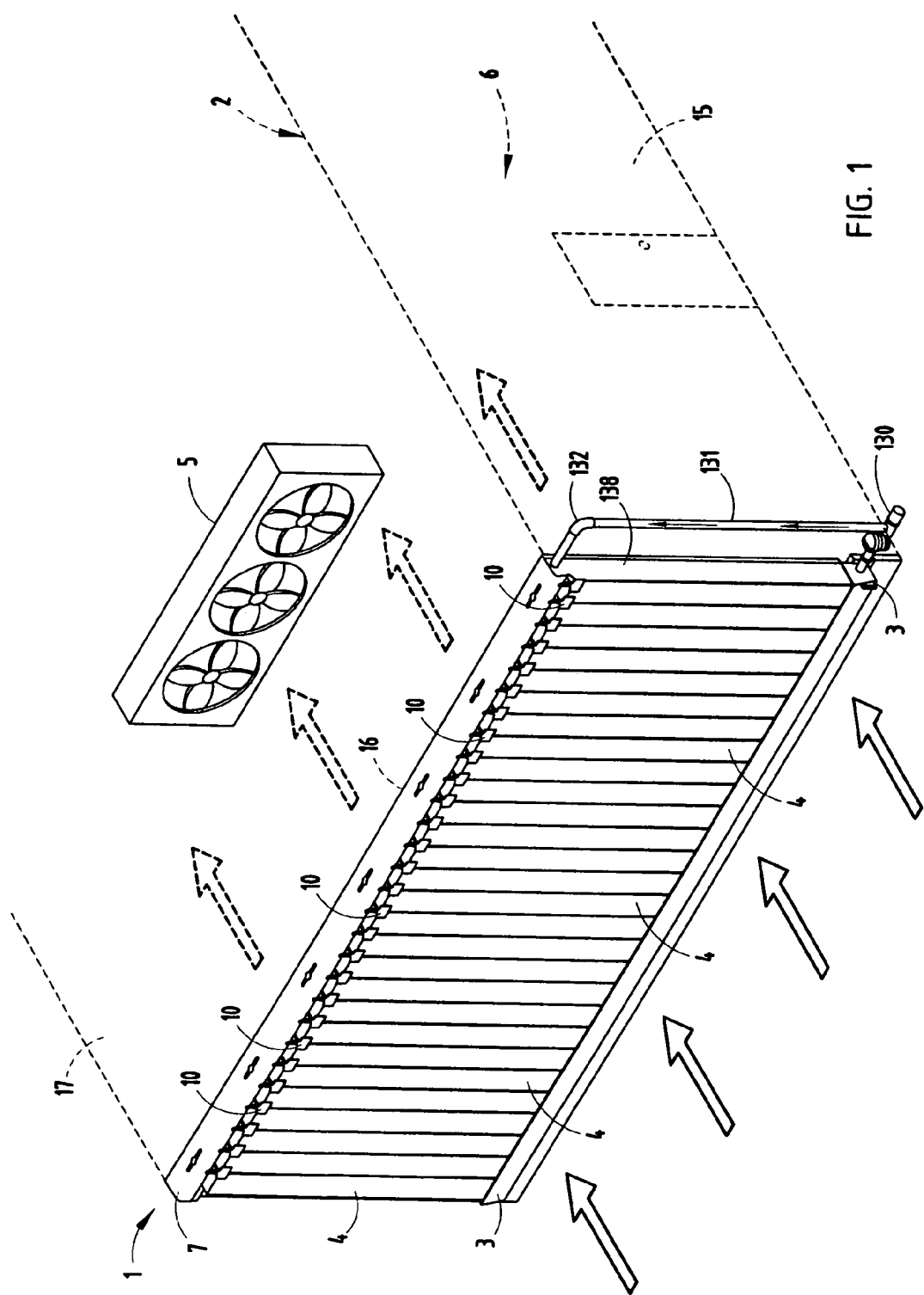
FIG. 1 is a partially schematic, perspective view of an evaporative cooling system embodying the present invention, shown installed in an associated poultry house.

For purposes of description herein the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates an evaporative cooling system embodying the present invention. Evaporative cooling system 1 is particularly adapted for use in conjunction with agricultural and/or horticultural buildings, such as the illustrated poultry house 2. Evaporative cooling system 1 includes a cooling water reservoir 3, evaporative pads 4 positioned directly above reservoir 3, and a fan or other similar blower mechanism 5 disposed on one side of pads 4 to draw ambient air horizontally through the wetted pads 4 to evaporate a portion of the cooling water flowing vertically therethrough, and flow the cooled ambient air into an interior portion 6 of poultry house 2. A header 7 (FIGS. 36-37) is disposed above and along the upper ends of pads 4, and includes a pipe or conduit 8 flowing cooling water longitudinally therethrough with orifices 9 shaped to emit streams of cooling water in a generally upwardly and outwardly direction. Pad retainers 10 are operably connected with header 7 and engage the upper ends of pads 4 to retain the same in a generally vertical orientation on reservoir 3. A deflector 11 extends above and outwardly of conduit 8, and has a hood-shaped configuration which deflects the streams of cooling water from orifices 9 and disburses the same in predetermined pattern onto and across the upper ends of pads 4. Deflector 11 has a flexible portion which permits the configuration of the deflector and the spray pattern to be varied to accommodate different configurations of pads 4.

The illustrated poultry house 2 (FIG. 1) has a generally conventional construction, comprising closed sidewalls 15, open ends 16 and a roof 17. As described in greater detail hereinafter, evaporative cooling system 1 is positioned adjacent one of the open ends 16 of poultry house 2, while fan 5 is positioned adjacent the opposite open end 16 of poultry house 2, so as to flow ambient air through evaporative cooling system 1 and poultry house 2 in the direction shown by the arrows in FIG. 1.

With reference to FIG. 2, the illustrated evaporative cooling system 1 includes a support frame 22, which is located at the open end 16 of poultry house 2, and has an open, substantially rectangular configuration defined by horizontal top and bottom members 23 and 24, and opposed vertical side members 25 and 26. Support frame 22 may be constructed of treated lumber, or the like, and can be attached directly to the structural support posts for poultry house 2. A plurality of U-shaped reservoir support brackets 27 are attached to the bottom member 24 of support frame 22, and serve to support reservoir 3 thereon in the manner described in greater detail hereinafter. A plurality of distributor header brackets or clips 28 are attached to the top member 23 of support frame 22, and serve to support header 7 thereon in the manner described in greater detail hereinafter.

With reference to FIGS. 17-21, the illustrated reservoir 3 is trough-shaped, with a generally U-shaped end elevational configuration defined by a base 35 and sidewalls 36 and 37 extending generally vertically upwardly from opposite sides of base 35. In the illustrated example, sidewalls 36 and 37 taper inwardly to base 35, and include reinforcing ribs 38 extending longitudinally therealong. As best shown in FIG. 19, reservoir 3 has a width measured between the upper edges of sidewalls 36 and 37 sufficient to accommodate both four inch thick and six inch thick pads 4. In the example shown in FIG. 17, reservoir 3 is fabricated from a plurality of elongate sections of U-shaped extruded PVC or vinyl trough sections 39, which are interconnected in an end-to-end relationship by unions 40. End caps 41 are attached to the open ends of trough sections 39 to provide a watertight construction through which cooling water flows. Trough sections 39, unions 40 and end caps 41 may be constructed from PVC or other synthetic resin materials, and are interconnected by means such as adhesive or the like. In the example illustrated in FIGS. 17 and 18, a water flow regulator 42 with a float 43 is disposed within the interior of reservoir 3, and is supported by one of the end caps 41 for purposes to be described in greater detail hereinafter. In general, reservoir 3 serves to hold a supply of clean cooling water that is pumped to and through header 7, and collects cooling water draining from the lower ends of pads 4.

With reference to FIGS. 19 and 20, a plurality of rigid, grid-like reservoir covers 48 are provided to support pads 4 abuttingly on reservoir 3. The illustrated reservoir covers 48 have a generally rectangular plan configuration, with opposite side flanges 49 configured for abutting support on the upper edges of reservoir sidewalls 36 and 37, and a perforate center portion 50, which permits cooling water which drains from the lower ends of pads 4 to flow therethrough into the interior of reservoir 3. Reservoir covers 48 have a rigid construction, and are positioned in an end-to-end relationship on top of reservoir 3, and serve to abuttingly support thereon the lower ends of pads 4, as shown in FIG. 5. In the example shown in FIG. 19, the side flanges 49 of reservoir covers 48 have an inverted, hook shape which forms slots 51 in which the upper edges of reservoir sidewalls 36 and 37 are closely received to positively locate the reservoir covers 48 on the reservoir 3. Reservoir covers 48 have a width which is substantially commensurate with the width of the top of reservoir 3, and sufficient to accommodate abuttingly supporting both four inch and six inch thick pads 4 thereon.

The illustrated reservoir support brackets 27 (FIG. 2) are generally U-shaped, and sized to closely receive and retain reservoir 3 therein. The rear legs 52 of brackets 27 may be formed at a right angle to the associated body portions of brackets 27, and are provided with fastener apertures therethrough to facilitate mounting the same to the bottom member 24 of support frame 22 with nails, threaded fasteners, or the like, in the manner shown in FIG. 2.

The illustrated distribution header support clips 28 (FIG. 3) are in the nature of formed straps or plates having flat central portions shaped for attachment to the top member 23 of support frame 22, upwardly turned and angled bottom legs 53 configured to engage a lower portion of the header 7, and V-shaped top legs 54 configured to engage an upper portion of the header 7 in a snap lock, as described more fully below. Clips 28 are attached to the top member 23 of support frame 22 by nails, threaded fasteners, or the like in the manner shown in FIGS. 2 and 3.

With reference to FIGS. 6-13, pads 4 have a generally conventional, honeycomb or corrugated construction of cellulose fiber or the like adapted to flow cooling water generally vertically therethrough and ambient air generally horizontal therethrough. In the illustrated example, two different sizes of pads 4 are illustrated, comprising a four inch thick pad 4a (FIGS. 6 and 8-10) and six inch thick pad 4b (FIGS. 7 and 11-13). Each of the four inch thick pads 4a has a generally similar rectangular configuration defined by an upper end 55a, a lower end 56a, opposite sides 57a and 58a, and upstream and downstream faces 59a and 60a, respectively. Each of the surfaces 55a-60a is generally flat and oriented in a right angular relationship with the next adjacent surface. Preferably, the length or height of each of the pads 4a is slightly less than the vertical distance between reservoir 3 and header 7. Six inch thick pads 4b are similar to four inch thick pads 4a, except for the six inch thickness, and are defined by an upper end 55b, a lower end 56b, sides 57b and 58b, as well as upstream and downstream faces 59b and 60b, respectively.

With reference to FIGS. 22-25, the illustrated header 7 is in the nature of a cooling water distribution and deflector assembly, and has a one-piece construction integrally molded from a synthetic resin material, such as PVC or the like. The conduit portion 8 of header 7 is located centrally, and has a cylindrical shape in the nature of a distribution pipe defined by outside surface 63 and inside surface 64 adapted to flow water therethrough along the length of header 7. In the illustrated example, pipe or conduit 8 has an outside diameter of around two inches. Orifices 9 are positioned along the length of conduit portion 8 in a regularly spaced apart fashion, and in the illustrated example, are oriented at an angle of approximately forty-five degrees above the horizon (approximately a two o'clock position as viewed in FIG. 24) to direct the streams of cooling water in a generally outwardly and upwardly direction toward deflector 11. The outside surface 63 of conduit 8 includes two outwardly extending ribs or barbs 65 and 66, which are designed to detachably mount pad retainers 10 on header 7 in the manner described in greater detail hereinafter.

The illustrated header 7 also includes an integrally formed base or back portion 70 which extends generally vertically on opposite sides of conduit 8. Back portion 70 includes a lower section 71 defined by a hollow rib 72 and a downwardly projecting L-shaped flange 73 formed integrally therewith. The upper end of flange 73 includes a generally horizontal surface 74, which mates with the forward wall 75 of rib 72, which defines with the adjacent portion of conduit outer surface 63, a mounting recess or slot 76 configured to support pad retainers 10 therein in the manner described in greater detail hereinafter. Flange 73 also includes a generally vertically extending upper leg 77, a generally horizontally extending leg 78 and a vertically extending lower leg 79. Rib 72 includes a rear wall 80 disposed in a generally flush relationship with the lower leg 79 of flange 73. Rib 72 is also defined by vertical surface 81 and angled surface 82 which is configured to engage the bottom legs 53 of clips 28, as shown in FIGS. 36 and 38, to support header 7 on the top member 23 of support frame 22.

The upper section 86 of header back portion 70 includes a rear wall 87 with a barb-shaped slot or channel 88 therein, which is configured to closely receive therein the V-shaped top legs 54 of clips 28, as shown in FIGS. 36 and 38, to mount header 7 on the top member 23 of support frame 22. An L-shaped flange portion 89 extends from a twelve o'clock position on the outer surface of conduit 8 to rear wall 87 to define a second hollow rib 90.

The deflector portion 11 of header 7 has a generally L-shaped configuration defined by a first leg 95 disposed operationally in a generally horizontal orientation, and a second leg 96 disposed operationally in a generally vertical orientation. A living hinge 97 is formed integrally along the rear edge of first or horizontal leg 95. In the illustrated example, living hinge 97 has a reduced thickness defined by opposite sidewalls 98 and 99 to facilitate flexing deflector 11 relative to header 7 along a predetermined hinge line. In the examples shown in FIGS. 22A and 24A, hinge wall 98 is somewhat longer than the opposite hinge wall 99 to accommodate pivoting deflector 11 in a clockwise direction, as viewed in FIGS. 22-24. Living hinge 97 may be formed from a more compliant material than the balance of header 7 by using a dual durometer construction technique, or the like. In the illustrated example, deflector legs 95 and 96 are generally flat, and are interconnected along an arcuate medial portion 100. The free end 101 of deflector leg 96 includes a teardrop-shaped fastener bead 102 extending longitudinally therealong, which is used to detachably connect deflector 11 to pad retainers 10 in the manner described in greater detail hereinafter.

In one working embodiment of the present invention, header 7 is molded with living hinge 97 in a generally flat condition, as shown in FIGS. 22, 22A and 23. Living hinge 97 is flexed during assembly into a generally right angle condition, as shown in FIGS. 24 and 24A for attachment of the free edge 101 and fastener bead 102 to pad retainers 10.

The illustrated evaporative cooling system 1 includes two different sizes of pad retainers 10, comprising a four inch pad retainer 10a (FIGS. 26-30) and a six inch pad retainer 10b (FIGS. 31-35). Four inch pad retainer 10a (FIGS. 26-30) is particularly adapted to support four inch pads 4a on header 7, and has a generally L-shaped side elevational configuration defined by a first leg 108a disposed operationally in a generally horizontal orientation, and a second leg 109a disposed operationally in a generally vertical orientation. The illustrated four inch pad retainer 10a has a one-piece construction molded from a synthetic resin material. The vertical leg portion 109a of four inch pad retainer 10a has a generally rectangular front plan configuration defined by a top edge 110a, a bottom edge 111a, and opposite side edges 112a and 113a. The rearward face of vertical leg 109a includes a plurality of inwardly extending ribs 115a which serve to engage the upper ends of four inch pads 4a. The horizontal leg 108a of four inch pad retainer 10a has a generally triangular side elevational configuration as shown in FIG. 26, and a generally T-shaped top plan configuration as shown in FIG. 27. The T-shaped end 118a of four inch pad retainer 10a includes an integrally molded, C-shaped snap fastener 119a with opposite jaws 120a and 121a which define a slot 122a between the free ends thereof. The interior surfaces of jaws 120a and 121a are configured similar to the bead-shaped snap fastener 102 along the free edge 101 of deflector 11 to receive the same therein with a snap lock action. An angled rib 123a attaches the T-shaped end 118a of four inch pad retainer 10a with a plate-shaped snap connector portion 124a. The interior edge of rib 123a includes a notch 125a which is shaped to closely receive and retain therein the barb 65 on conduit 8. The snap connector portion 124a of four inch pad retainer 10a includes a resilient latch arm 126a with an upstanding barb 127a shaped for mating engagement with the barb 66 on conduit 8. The inner end 128a of four inch pad retainer 10a is shaped for close reception within the notch 76 in header back 70 to facilitate attachment of four inch pad retainer 10a to header 7 in the following fashion.

Figure 16A:
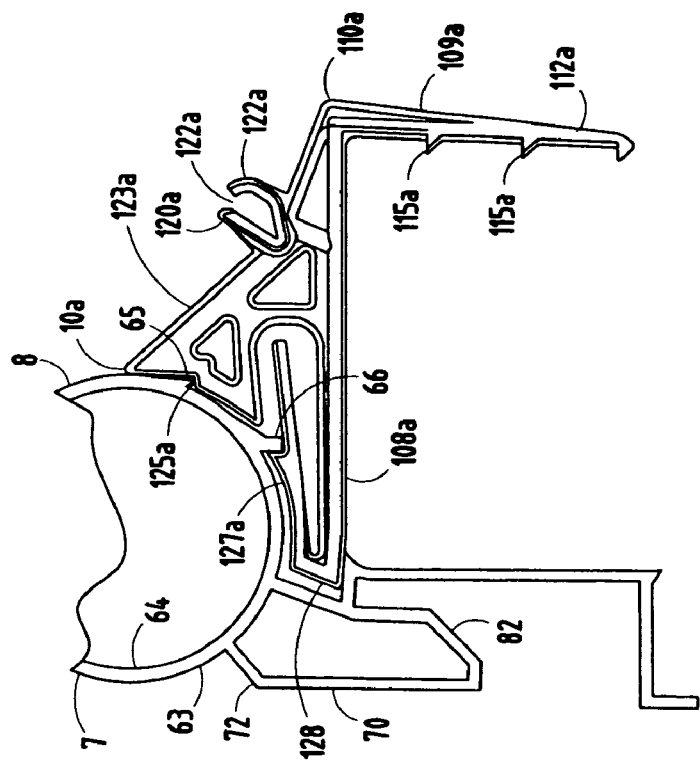
FIG. 16A is a side elevational view of the pad retainer, shown detachably mounted to the header.
Figure 16:
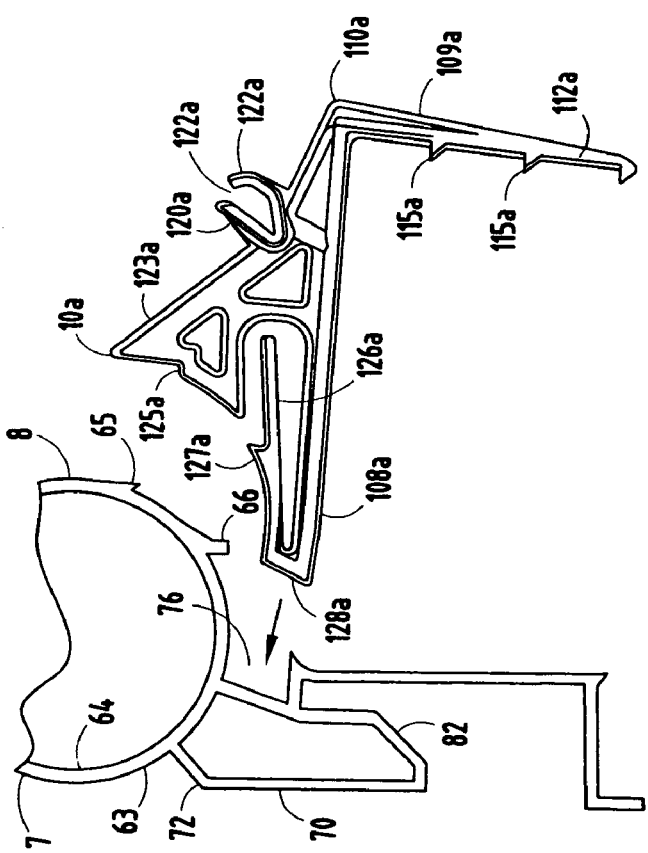
FIG. 16 is a side elevational view of the pad retainer, shown prior to attachment to the header.

With reference to FIGS. 16 and 16a, four inch pad retainer 10a is first oriented at an angle relative to header 7 in the manner shown in FIG. 16, with the inner end 128a of pad retainer 10a generally vertically aligned with the notch 76 on header back 70. The inner end 128a of four inch pad retainer 10a is then inserted into slot 76, and the pad retainer 10a is then shifted upwardly, so that the barb 127a on latch arm 126a mates with and locks into the barb 66 on conduit 8, and the barb 65 on conduit 8 is locked into the notch 125a on rib 123a. Hence, a plurality of pad retainers 10a can be securely, yet detachably, mounted on header 7 at a variety of positions along the length thereof in a very quick and easy fashion, so as to support different pad configurations on header 7.

Six inch pad retainer 10b (FIGS. 31-35) is particularly adapted to support six inch pads 4b on header 7, and has a generally L-shaped side elevational configuration defined by a first leg 108b disposed operationally in a generally horizontal orientation, and a second leg 109b disposed operationally in a generally vertical orientation. The illustrated six inch pad retainer 10b has a one-piece construction molded from a synthetic resin material. The vertical leg portion 109b of six inch pad retainer 10b has a generally rectangular front plan configuration defined by a top edge 110b, a bottom edge 111b, and opposite side edges 112b and 113b. The rearward face of vertical leg 109b includes an inwardly extending bottom rib 115b which serves to engage the upper ends of six inch pads 4b. The horizontal leg 108b of six inch pad retainer 10*b* is longer than that of four inch pad retainer 10*a*, and has a generally triangular side elevational configuration as shown in FIG. 31, and a generally T-shaped top plan configuration as shown in FIG. 32. The T-shaped end 118*b* of six inch pad retainer 10*b* includes an integrally molded, C-shaped snap fastener 119*b* with opposite jaws 120*b* and 121*b* which define a slot 122*b* between the free ends thereof. The interior surfaces of jaws 120*b* and 121*b* are configured similar to the bead-shaped snap fastener 102 along the free edge 101 of deflector 11 to receive the same therein with a snap lock action. An angled rib 123*b* attaches the T-shaped end 118*b* of six inch pad retainer 10*b* with a plate-shaped snap connector portion 124*b*. The interior edge of rib 123*b* includes a notch 125*b* which is shaped to closely receive and retain therein the barb 65 on conduit 8. The snap connector portion 124*b* of six inch pad retainer 10*b* includes a resilient latch arm 126*b* with an upstanding barb 127*b* shaped for mating engagement with the barb 66 on conduit 8. The inner end 128*b* of six inch pad retainer 10*b* is shaped for close reception within the notch 76 in header back 70 to facilitate attachment of six inch pad retainer 10*b* to header 7 in the same fashion four inch pad retainers 10*a* are attached to header 7, as described above, and shown in FIGS. 16 and 16A.

With reference to FIG. 1, the illustrated evaporative cooling system 1 is plumbed in an end feed configuration using conventional techniques. A freshwater line or other source of clean cooling water is communicated with water regulator 42, which by action of float 43 maintains a predetermined depth of cooling water in reservoir 3. A pump 130 is provided adjacent the outlet side of reservoir 3, and serves to pump or flow the cooling water to the conduit portion 8 of header 7 through a series of pipes 131 and associated fittings 132.

In operation, evaporative cooling system 1 can be readily adapted in the following fashion to accommodate a wide variety of different types of poultry houses and/or other similar applications. Frame 22 is erected along one of the open ends 16 of poultry house 2 at a location opposite fan 5. Brackets 27 are attached to the bottom member 24 of support frame 22 in the manner described above, and reservoir 3 is then completely assembled and mounted on brackets 27. Clips 28 are then attached to the top member 23 of support frame 22 in the manner described above, and header 7 is snapped onto clips 28 in the following fashion. The lower legs or tangs of clips 28 are first positioned against the angled surface 82 of header back 70. The header 7 is then rotated rearwardly, so that the V-shaped legs 54 on clips 28 snap into the channel or slot 88 in the back portion 70 of header 7. In the event the installation is wider than the length of one section of header 7, additional lengths of header 7 can be joined together using couplers 135, as shown in FIG. 4. Alternatively, header 7 can be installed on clips 28 by sliding lengths of header 7 longitudinally over clips 28.

Evaporative pads 4 are then selected in accordance with the desired cooling needs of the specific poultry house 2. In general, greater thicknesses of pads 4 provide increased evaporative cooling capability per square foot of airflow surface area. In the example illustrated in FIGS. 36, 36A and 37, four inch thick pads 4*a* are selected and arranged in a side-by-side fashion on top of the reservoir covers 48 on reservoir 3. Four inch pad retainers 10*a* are then selected, and detachably mounted on header 7 in the manner shown in FIGS. 16 and 16A and described hereinabove, at locations between each of the adjacent upper ends of four inch pads 4*a*. Pad retainers 10*a* capture the upper ends 55*a* of four inch pads 4*a* between the vertical plates or legs 109*a* of pad retainers 10*a* and the wall 75 of header back 70. End panels 138 (FIG. 2) may be attached to the exterior side faces of two end pads 4*a* to protect the same. Deflector 11 is rotated downwardly about living hinge 97, and the fastener bead 102 along the free end 101 of deflector 11 is then snapped into the fastener portions 119 of the pad retainers 10*a* by inserting bead 102 into the slot 122*a* between jaws 120*a* and 121*a*, so as to securely, yet detachably, retain the same therein. The flexure of deflector 11 about living hinge 97 and subsequent attachment of free end 101 to pad retainers 10*a* securely retains deflector 11 in a first predetermined configuration which will serve to deflect the streams of cooling water emitted from orifices 9, and disburse the same in a predetermined pattern onto and uniformly across the upper ends 55*a* of pads 4*a*. Preferably, the cooling water is sprayed onto the upper ends 55*a* of pads 4*a* adjacent the upstream faces 59*a* thereof, so that, as the cooling water migrates vertically downwardly through the pads 4*a*, water droplets will not be pulled completely through the downstream faces 60*a* of the pads 4*a* into the interior 6 of the poultry house 2.

In the embodiment shown in FIGS. 36, 36A and 37, the top plate or leg 95 of deflector 11 is oriented at an angle of around twenty to twenty-five degrees relative to the horizontal, and the front plate or leg 96 of deflector 11 is oriented at an angle of around twenty to thirty degrees relative to the vertical, resulting in a shape which deflects the streams of cooling water from orifices 9 in a uniform pattern onto the first or upstream one third of the pads 4*a*. The cooling water trickles uniformly through pads 4*a* to maximize cooling efficiency, without drawing moisture into the interior 6 of poultry house 2.

In the example illustrated in FIGS. 38, 38A and 39, six inch thick pads 4*b* are selected, so as to provide additional cooling for poultry house 2. Six inch pads 4*b* are arranged in a side-by-side fashion on the reservoir covers 48 on reservoir 3 in a manner similar to that described above. Six inch pad retainers 10*b* are selected and mounted to header 7 in a manner similar to that shown in FIGS. 16 and 16A and discussed above, at locations between each of the six inch pads 4*b* at the upper edges 55*b* thereof. Pad retainers 10*b* capture the upper ends 55*b* of six inch pads 4*b* between the vertical plates or legs 109*b* of pad retainers 10*b* and the wall 75 of header back 70. Deflector 11 is then rotated downwardly about living hinge 97, and the free end 101 of deflector 11 is attached to the fastener portion 119*b* of pad retainers 10*b* by inserting the fastener bead 102 into the slots 122*b* between jaws 120*b* and 121*b* of each of the pad retainers 10*b*. In a manner similar to that described above relative to FIGS. 36, 36A and 37, the flexure of deflector 11 about living hinge 97 and subsequent attachment of free end 101 to pad retainers 10*b* securely retains deflector 11 in a second predetermined configuration which is different from the shape shown in FIGS. 36, 36A and 37, but still serves to deflect the streams of cooling water emitted from orifices 9, and disburse the same in a predetermined pattern onto an across the upper ends 55*b* of pads 4*b*. Preferably, the cooling water is sprayed onto the upper ends 55*b* of pads 4*b* adjacent the upstream faces 59*b* thereof, so that, as the cooling water migrates vertically downwardly through the pads 4*b*, water droplets will not be pulled completely through the downstream faces 60*b* of pads 4*b* into the interior 6 of poultry house 2.

In the embodiment shown in FIGS. 38, 38A and 39, the top plate or leg 95 of deflector 11 is oriented at an angle of around five to ten degrees relative to the horizontal, and the front plate or leg 96 of deflector 11 is oriented at an angle of around five to ten degrees relative to the vertical, resulting in a shape which deflects the streams of cooling water from orifices 9 in a uniform pattern onto the first or upstream one third of the pads 4*b*. The cooling water trickles uniformly through pads 4*b* to maximize cooling efficiency, without drawing moisture into the interior 6 of poultry house 2.

As will be appreciated by those skilled in the art, the location and orientation of orifices 9 in conduit 8 can also be varied to accommodate different applications. For example, the angle of orifices 9 may be set at around sixty degrees from the vertical in FIGS. 38-39, so that the streams of cooling water emitted from orifices 9 impinge upon the arcuate medial portion 100 of deflector 11, thereby creating a spray pattern which more fully saturates the entire upper ends 55*b* of pads 4*b* without the need for an intermediate soaker member. Other similar variations are also contemplated herein to achieve the desired cooling for a particular application.

As best illustrated in FIGS. 36-37, header 7 is preferably mounted on support frame 22 at a height which forms a gap or vertical space 140 between the free end 101 of deflector 11 and the upper ends 55*a*, 55*b* of pads 4*a*, 4*b*. The sprays or showers of the cooling water from deflector 11 can be seen through gap 140, thereby providing a visual indication to the operator that evaporative cooling system 1 is operational and working properly.

As is apparent from a comparison between the configurations of deflector 11 in FIGS. 36-37 and 38-39, respectively, the shape of the deflector 11 is automatically adjusted to ensure that the streams of cooling water from orifices 9 are deflected from the deflector 11 in a uniform pattern along the upper ends of those pads which have been selected for a specific application. This feature, in combination with the detachable mounting of pad retainers 10*a* and 10*b* on a common header 7, and the use of a common reservoir 3, minimize manufacturing costs, and permit evaporative cooling system 1 to be easily and economically adapted to accommodate a wide variety of different applications and specific customer needs.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An evaporative cooling system for poultry houses and the like, comprising:
    a reservoir disposed adjacent to an open portion of an associated poultry house, and configured to communicate with a source of cooling water, and flow cooling water through at least a portion of said system;
    at least one evaporative pad configured to flow cooling water generally vertically therethrough and ambient air generally horizontally therethrough; said pad having a lower end thereof disposed directly above said reservoir to drain cooling water from said lower end of said pad into said reservoir, and an upper end thereof configured to receive cooling water thereon;
    a fan disposed on one side of said pad and adapted to flow ambient air through said pad in a generally horizontal direction to evaporate a portion of the cooling water flowing generally vertically through said pad, and thereby lower the temperature of the ambient air, and subsequently flow the cooled ambient air into an interior portion of the poultry house; and
    a header disposed above and along said upper end of said pad, and including
    a water distribution conduit configured to flow cooling water longitudinally therethrough, and including a plurality of orifices positioned along the length of said conduit and shaped to emit streams of water cooling therefrom in a generally outwardly direction; and
    a deflector extending generally above and outwardly of said conduit, and having a generally hood-shaped, predetermined configuration which deflects the streams of cooling water emitted from said orifices, and disburses the same in a predetermined pattern onto and across said upper end of said pad; said deflector having a flexible portion which permits said predetermined configuration of said deflector and said predetermined spray pattern to be varied to accommodate different configurations of said pad.

2. An evaporative cooling system as set forth in claim 1, wherein:
    said flexible portion of said deflector is defined by an integrally formed living hinge.

3. An evaporative cooling system as set forth in claim 2, wherein:
    said deflector has a generally L-shaped configuration defined by a first leg disposed operationally in a generally horizontal orientation, and a second leg disposed operationally in a generally vertical orientation; and
    said living hinge is disposed along a rear edge of said first leg.

4. An evaporative cooling system as set forth in claim 3, wherein:
    said second leg of said deflector includes a free edge disposed operationally in a generally downward orientation at a location adjacent to said upper end of said pad, and is shiftable in a direction toward and away from said conduit to accommodate different configurations of said pad.

5. An evaporative cooling system as set forth in claim 4, including:
    a pad retainer having a first portion thereof operably connected with an upper portion of said pad, and a second portion thereof operably connected with said header to retain said pad in a generally vertical orientation.

6. An evaporative cooling system as set forth in claim 5, wherein:
    said free edge of said deflector is operably connected with said pad retainer to positively retain said deflector in said predetermined configuration.

7. An evaporative cooling system as set forth in claim 6, wherein:
    said pad defines a first pad having a first predetermined thickness measured between opposite side faces thereof; and
    said pad retainer defines a first pad retainer, configured to engage said upper portion of said first pad, and including a fastener portion thereof detachably connected with said free edge of said deflector to securely, yet releasably, retain said deflector in a first configuration shaped for disbursing cooling water along said upper edge of said first pad.

8. An evaporative cooling system as set forth in claim 7, including:
    a second pad having a second predetermined thickness measured between opposite side faces thereof, which is different than said predetermined thickness of said first pad; and a second pad retainer configured to engage an upper portion of said second pad, and including a fastener portion thereof detachably connected with said free edge of said deflector to securely, yet releasably, retain said deflector in a second configuration shaped for disbursing cooling water along an upper edge of said second pad.

9. An evaporative cooling system as set forth in claim 8, wherein:
said header includes a base disposed generally below said conduit and having a first connector thereon; and
said first pad retainer includes a second connector configured to mate with said first connector on said base to detachably mount said first pad retainer on said base of said header.

10. An evaporative cooling system as set forth in claim 9, wherein:
said second pad retainer includes a third connector shaped similar to said second connector on said first pad retainer, and configured to mate with said first connector on said header to alternatingly detachably mount one of said first and second pad retainers on said base of said header to support either one of said first and second pads.

11. An evaporative cooling system as set forth in claim 10, wherein:
said second and third connectors define portions of a snap lock detachably mounting at least one of said first and second pad retainers on said base of said header.

12. An evaporative cooling system as set forth in claim 11, wherein:
said header has a one-piece construction molded from a synthetic resin material.

13. An evaporative cooling system as set forth in claim 12, wherein:
said living hinge is molded in a generally flat condition, and flexed during assembly into a generally right angle condition for attachment of said free end of said second leg to one of said first and second pad retainers.

14. An evaporative cooling system as set forth in claim 13, including:
a generally rectangular frame disposed adjacent to the open portion of the associated poultry house; and
a plurality of first brackets attached to a lower portion of said frame and supporting said reservoir on said frame at a predetermined height.

15. An evaporative cooling system as set forth in claim 14, including:
a plurality of second brackets attached to an upper portion of said frame and supporting said header on said frame at a predetermined height above said reservoir.

16. An evaporative cooling system as set forth in claim 15, wherein:
said header includes an integrally formed slot extending along a rearward side thereof in which portions of said second brackets are received to securely, yet detachably, support said header on said frame.

17. An evaporative cooling system as set forth in claim 16, wherein:
said first and second pad retainers each have a generally L-shaped configuration with a first leg disposed operationally in a generally horizontal orientation and defining said first portion thereof, and a second leg disposed operationally in a generally vertical orientation and defining said second portion thereof.

18. An evaporative cooling system as set forth in claim 1, including:

a pad retainer having a first portion thereof operably connected with an upper portion of said pad, and a second portion thereof detachably connected with said header to securely, yet detachably, retain said pad in a generally vertical orientation.

19. An evaporative cooling system as set forth in claim 18, wherein:
said deflector is operably connected with said pad retainer to positively retain said deflector in said predetermined configuration.

20. An evaporative cooling system for poultry houses and the like, comprising:
a reservoir disposed adjacent to an open portion of an associated poultry house, and configured to communicate with a source of cooling water, and flow cooling water through at least a portion of said system;
at least one evaporative pad configured to flow cooling water generally vertically therethrough and ambient air generally horizontally therethrough; said pad having a lower end thereof disposed directly above said reservoir to drain cooling water from said lower end of said pad into said reservoir, and an upper end thereof configured to receive cooling water thereon;
a fan disposed on one side of said pad and adapted to flow ambient air through said pad in a generally horizontal direction to evaporate a portion of the cooling water flowing generally vertically through said pad, and thereby lower the temperature of the ambient air, and subsequently flow the cooled ambient air into an interior portion of the poultry house;
a header disposed above and along said upper end of said pad, and including
a water distribution conduit configured to flow cooling water longitudinally therethrough, and including a plurality of orifices positioned along the length of said conduit and shaped to emit streams of water cooling therefrom in a generally outwardly direction;
a deflector extending generally above and outwardly of said conduit, and having a generally hood-shaped, predetermined configuration which deflects the streams of cooling water emitted from said orifices, and disburses the same in a predetermined pattern onto and across said upper end of said pad; and
a base disposed generally below said conduit and having a first connector thereon; and
a pad retainer having a first portion thereof operably connected with an upper portion of said pad, and a second portion thereof having a second connector configured to mate with said first connector on said base to securely, yet detachably, mount said pad retainer on said base of said header and thereby retain said pad in a generally vertical orientation.

21. An evaporative cooling system as set forth in claim 20, wherein:
said pad defines a first pad having a first predetermined thickness measured between opposite side faces thereof; and
said pad retainer defines a first pad retainer, configured to engage said upper portion of said first pad, and including a fastener portion thereof detachably connected with a free edge of said deflector to securely, yet releasably, retain said deflector in a first configuration shaped for disbursing cooling water along said upper edge of said first pad.

22. An evaporative cooling system as set forth in claim 21, including:

a second pad having a second predetermined thickness measured between opposite side faces thereof, which is different than said predetermined thickness of said first pad; and a second pad retainer configured to engage an upper portion of said second pad, and including a fastener portion thereof detachably connected with said free edge of said deflector to securely, yet releasably, retain said deflector in a second configuration shaped for disbursing cooling water along an upper edge of said second pad.

23. An evaporative cooling system as set forth in claim 22, wherein:

said first and second pad retainers each have a generally L-shaped configuration with a first leg disposed operationally in a generally horizontal orientation and defining said first portion thereof, and a second leg disposed operationally in a generally vertical orientation and defining said second portion thereof.

24. An evaporative cooling system as set forth in claim 23, wherein:

said first connector on said base of said header comprises a plurality of longitudinally spaced apart slots; and said second connector on said first and second pad retainers comprises a wedge-shaped tab configured for close reception in one of said slots, and having a resilient locking arm which selectively engages said base behind said one slot to positively, yet releasably, mount said first and second pad retainers on said header.

25. A method for making an evaporative cooling system for poultry houses and the like, comprising the steps of:

forming a reservoir with a configuration adapted to communicate with a source of cooling water, and flow cooling water through at least a portion of the system;

providing a plurality of first evaporative pads having upper and lower ends, a first predetermined thickness measured between opposite side faces thereof, and a configuration which permits cooling water to flow generally vertically therethrough and ambient air to flow generally horizontally therethrough;

providing a plurality of second evaporative pads having upper and lower ends, a second predetermined thickness measured between opposite side faces thereof which is different than the predetermined thickness of the first pads, and a configuration which permits cooling water to flow generally vertically therethrough and ambient air to flow generally horizontally therethrough;

forming a header with a water distribution conduit configured to flow cooling water longitudinally therethrough, and including a plurality of orifices positioned along the length of the conduit and shaped to emit streams of water cooling therefrom in a generally outwardly direction, and a deflector extending generally above and outwardly of the conduit, and having a generally hood-shaped, predetermined configuration which deflects the streams of cooling water emitted from the orifices, and is adapted to disburse the same in a predetermined pattern onto and across the upper end of at least one of the first and second pads;

forming a flexible living hinge along the deflector at a location which permits the predetermined configuration of the deflector and the predetermined spray pattern to be varied to accommodate use of either one of the first and second pads with the header;

forming a plurality of first pad retainers with first portions thereof configured to engage upper portions of the first pads, and lower portions thereof configured for operable connection with the header to retain the first pads in a generally vertical orientation;

forming a plurality of second pad retainers with first portions thereof configured to engage upper portions of the second pads, and lower portions thereof configured for operable connection with the header to retain the second pads in a generally vertical orientation;

mounting the reservoir adjacent to an open portion of an associated poultry house;

communicating the reservoir with a source of cooling water;

selecting at least one of the first and second pads in accordance with predetermined cooling requirements of the poultry house;

positioning the selected pad generally above the reservoir, such that the lower end of the selected pad is positioned directly above the reservoir to drain cooling water exiting from the lower end of the selected pad into the reservoir;

mounting the header along the upper end of the selected pad;

selecting at least one of the first and second pad retainers according to the predetermined thickness of the selected pad;

operatively connecting the upper portion of the selected pad retainer with the upper portion of the selected pad, and operatively connecting the lower portion of the selected pad retainer with the header to retain the selected pad in a generally vertical orientation above the reservoir;

flexing the deflector along the living hinge into a predetermined configuration which deflects the streams of cooling water emitted from the orifices, and disburses the same in a predetermined pattern onto and across the upper end of the selected pad; and operably connecting the deflector with the selected pad retainer to retain the deflector in the predetermined configuration.

26. A method as set forth in claim 25, including:

forming a generally rectangular frame adjacent the open portion of the poultry house;

attaching a plurality of first brackets to a lower portion of the frame; and detachably mounting the reservoir on the first brackets to support the reservoir on the frame at a predetermined height.

27. A method as set forth in claim 26, including:

attaching a plurality of second brackets to an upper portion of the frame; and detachably mounting the header on the second brackets to support the header on the frame at a predetermined height above the reservoir.

28. A method as set forth in claim 27, wherein:

said header forming step comprises integrally molding said header with a one-piece construction from a synthetic resin material.

29. A method as set forth in claim 28, wherein:

said header forming step comprises molding the living hinge in a generally flat condition; and said flexing step comprises flexing the living hinge into a generally right angle condition prior to said deflector connecting step.

30. A method for making an evaporative cooling system for poultry houses and the like, comprising the steps of:

forming a reservoir with a configuration adapted to communicate with a source of cooling water, and flow cooling water through at least a portion of the system;

providing a plurality of first evaporative pads having upper and lower ends, a first predetermined thickness measured between opposite side faces thereof, and a configuration which permits cooling water to flow generally vertically therethrough and ambient air to flow generally horizontally therethrough;

providing a plurality of second evaporative pads having upper and lower ends, a second predetermined thickness measured between opposite side faces thereof which is different than the predetermined thickness of the first pads, and a configuration which permits cooling water to flow generally vertically therethrough and ambient air to flow generally horizontally therethrough;

forming a header with a water distribution conduit configured to flow cooling water longitudinally therethrough, and including a plurality of orifices positioned along the length of the conduit and shaped to emit streams of water cooling therefrom in a generally outwardly direction, and a deflector extending generally above and outwardly of the conduit, and having a generally hood-shaped, predetermined configuration which deflects the streams of cooling water emitted from the orifices, and is adapted to disburse the same in a predetermined pattern onto and across the upper end of at least one of the first and second pads, and a base disposed generally below the conduit and having a first connector thereon;

forming a plurality of first pad retainers with upper portions thereof configured to engage upper portions of the first pads, and lower portions thereof with second connectors configured to mate with the first connector on the base of the header;

forming a plurality of second pad retainers with upper portions thereof configured to engage upper portions of the second pads, and lower portions thereof with second connectors configured to mate with the first connector on the base of the header;

mounting the reservoir adjacent to an open portion of an associated poultry house;

communicating the reservoir with a source of cooling water;

selecting at least one of the first and second pads in accordance with predetermined cooling requirements of the poultry house;

positioning the selected pad generally above the reservoir, such that the lower end of the selected pad is positioned directly above the reservoir to drain cooling water exiting from the lower end of the selected pad into the reservoir;

mounting the header along the upper end of the selected pad;

selecting at least one of the first and second pad retainers according to the predetermined thickness of the selected pad; and operatively connecting the upper portion of the selected pad retainer with the upper portion of the selected pad, and detachably connecting the second connector on the lower portion of the selected pad retainer with the first connector on the base of the header to securely, yet detachably, mount the same thereon, and thereby retain the selected pad in a generally vertical orientation above the reservoir.

* * * * *